United States Patent [19]
Andersson et al.

[11] Patent Number: 5,688,729
[45] Date of Patent: Nov. 18, 1997

[54] WHISKER-REINFORCED CERAMIC MATERIAL

[75] Inventors: Mats Andersson, Huddinge; Marianne Collin, Enskede, both of Sweden

[73] Assignee: Sandvik AB, Sandviken, Sweden

[21] Appl. No.: 662,523

[22] Filed: Jun. 13, 1996

Related U.S. Application Data

[62] Division of Ser. No. 492,521, Jun. 20, 1995.

[30] Foreign Application Priority Data

Jul. 15, 1994 [SE] Sweden .................... 9402513

[51] Int. Cl.$^6$ .................. C04B 35/119; C04B 35/577; C04B 35/58
[52] U.S. Cl. .................. 501/89; 501/95; 264/64; 264/65
[58] Field of Search .................. 501/87, 89, 91, 501/92, 95, 96, 105, 127, 128; 264/64, 65

[56] References Cited

U.S. PATENT DOCUMENTS

| | | |
|---|---|---|
| 4,543,345 | 9/1985 | Wei . |
| 4,745,091 | 5/1988 | Landingham . |
| 4,746,635 | 5/1988 | Inoue et al. . |
| 4,789,277 | 12/1988 | Rhodes et al. . |
| 4,804,645 | 2/1989 | Ekstrom . |
| 4,849,381 | 7/1989 | Brandt et al. . |
| 4,867,761 | 9/1989 | Brandt et al. . |
| 4,961,757 | 10/1990 | Rhodes et al. . |
| 5,110,770 | 5/1992 | Brandt et al. . |
| 5,123,935 | 6/1992 | Kanamaru et al. . |
| 5,238,334 | 8/1993 | Brandt et al. . |
| 5,418,197 | 5/1995 | Brandt . |

FOREIGN PATENT DOCUMENTS 149062  5/1992  Japan .

*Primary Examiner*—Karl Group
*Attorney, Agent, or Firm*—Burns, Doane, Swecker & Mathis, L.L.P.

[57] ABSTRACT

There is now provided a ceramic material comprising of alumina, 10–50% by volume, preferably 20–35% by volume, silicon carbide whiskers, 1–25% by volume, preferably 5–20% by volume, most preferably 7–15% by volume, zirconia and 1–20% by volume, preferably 3–15% by volume, titanium compound-containing cubic phase. If this cubic phase has a lattice spacing of 4.29 to 4.40 Å and a zirconium content of 3–65 weight %, a material with improved performance when turning heat resistant material such as aged Iconel 718, is obtained.

7 Claims, 1 Drawing Sheet

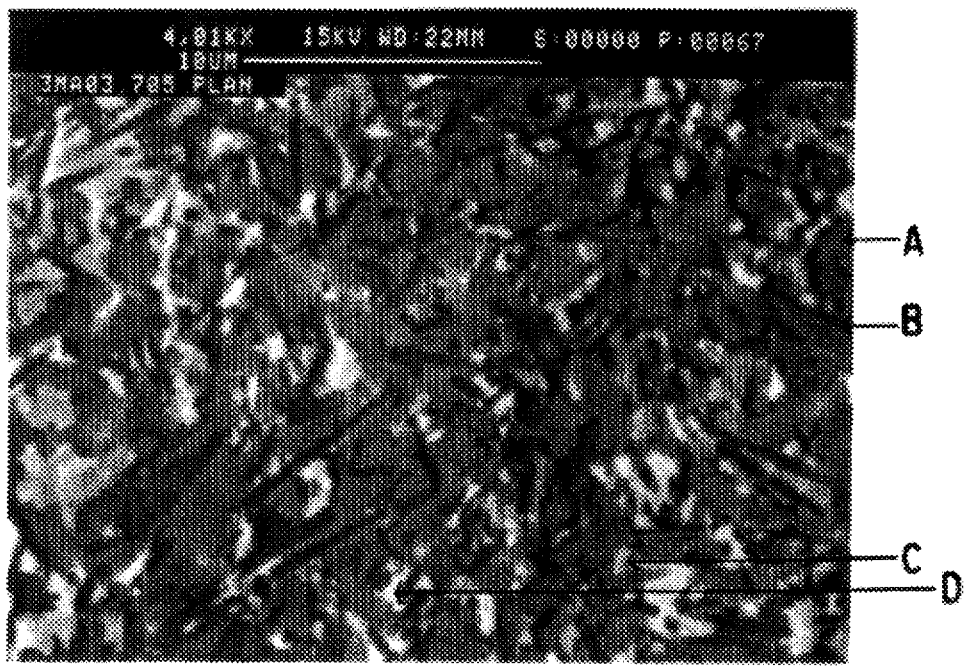

WHISKER-REINFORCED CERAMIC MATERIAL

This application is a divisional of application Ser. No. 08/492,521, filed Jun. 20, 1995.

BACKGROUND OF THE INVENTION

The present invention relates to a whisker-reinforced ceramic material with improved performance particularly when machining heat resistant materials.

It is well-known in the art that the fracture toughness of a ceramic material can be increased by addition of monocrystalline hair crystals (whiskers) and/or platelets. A material consisting of SiC-whiskers in an alumina matrix is disclosed in U.S. Pat. No. 4,543,345. U.S. Pat. No. 4,867,761 discloses the use of whiskers of carbides, nitrides or borides of Ti and/or Zr in an alumina matrix. Through U.S. Pat. No. 4,849,381, a cutting tool insert comprising a mixture of whiskers and platelets is known.

U.S. Ser. No. 08/089,560 and 08/090,960 (our references: 024000-963 and 024000-965), herein incorporated by reference, discloses a method of manufacturing a whisker-reinforced ceramic body comprising 2–50% by volume whiskers and/or platelets in a ceramic matrix by powder metallurgical methods, i.e. dispersion in a suitable liquid, granulation, compaction and sintering. If the granulation is performed by freeze granulation, a ceramic body with homogenous structure with essentially no granule borders is obtained.

JP-A-4-149062 discloses a composite ceramic containing TiN-particles and SiC-whiskers in an alumina matrix.

U.S. Pat. No. 4,746,635 discloses sintered ceramic composite-containing alumina, zirconia and SiC-whiskers.

OBJECTS AND SUMMARY OF THE INVENTION

It is an object of this invention to avoid or alleviate the problems of the prior art.

It is further an object of this invention to provide whisker-reinforced ceramic material with improved performance particularly when machining heat resistant materials.

In one aspect of the invention there is provided a ceramic material comprising alumina, 10–50% by volume of silicon carbide whiskers, 1–25% by volume of zirconia and 1–20% by volume of a titanium compound-containing cubic phase, said cubic phase having a lattice spacing of 4.29 to 4.40 Å and a zirconium content of 3–65 weight %.

In another aspect of the invention there is provided a method of manufacturing a ceramic material comprising alumina, 10–50% by volume of silicon carbide whiskers, 1–25% by volume of zirconia and 1–20% by volume of a titanium compound-containing cubic phase comprising mixing and granulating silicon carbide whiskers, powders of alumina and zirconia and a titanium compound capable of forming a cubic phase and hot pressing the mixture at a hot press temperature of 1500°–1750° C. and a hot press pressure of 5–40 MPa, the heating up period of the hot pressing before the hot pressing temperature is reached and the mechanical pressure is applied, being performed under a subpressure of 50 to 800 mbar.

BRIEF DESCRIPTION OF THE DRAWINGS

The figure shows in 4000× magnification, the structure of the material according to the presently claimed invention in which A=alumina
B=SiC-whisker
C=cubic phase
D=zirconia

DETAILED DESCRIPTION OF THE PREFERRED EMBODIMENTS OF THE INVENTION

It has now been found that when hot pressing using optimal process data, a material consisting of alumina, silicon carbide whiskers, zirconia and titanium nitride, a cubic phase is formed with a larger lattice spacing than that formed for any combinations of titanium nitride and one or two of the other components. This material is found to have improved performance when turning heat resistant material such as aged Iconel 718.

The material according to the presently claimed invention comprises of alumina, 10–50% by volume, preferably 20–35% by volume, silicon carbide whiskers, 1–25% by volume, preferably 5–20% by volume, most preferably 7–15% by volume, zirconia and 1–20% by volume, preferably 3–15% by volume, titanium compound-containing cubic phase. The mount of yttria in the yttria-stabilized zirconia should be 1–5% by mole, preferably 2–4% by mole, most preferably 3% by mole. The zirconia is mainly localized close to the silicon carbide whiskers. The silicon carbide whiskers should have a diameter of 0.1–2.0 μm, preferably 0.3–1.5 μm, most preferably 0.4–1.0 μm, and an aspect ratio of 5–100, preferably 10–50. The silicon carbide whiskers are uniformly distributed in the material. The whisker direction is however, due to the hot pressing, mainly two-dimensional. The titanium compound-containing cubic phase is uniformly distributed in the matrix. The lattice spacing of the titanium compound-containing cubic phase is 4.29–4.40 Å, preferably 4.31–4.35 Å. This is an increase in lattice spacing from pure titanium nitride (4.24 Å). Although we do not wish to be bound by any theoretical explaining, this increase in lattice spacing can be explained by a diffusion of zirconium and carbon into the cubic phase. The zirconium content in the cubic phase is 3–65 weight %, preferably 10–30 weight %, the carbon content is 1–20 weight %, preferably 5–10 weight %, and the oxygen content less than 3 weight %. The zirconia phase is mainly tetragonal. The amount of monoclinic zirconia (evaluated by XRD, peak height) is maximum 30%, preferably maximum 10%. The average grain size of the alumina matrix is 0.5–5 μm, preferably 0.5–2 μm. The density of the material is 97–100% of theoretical density, preferably 100%. The mean pore size is lower than 1 μm, preferably lower than 0.5 μm.

The material according to the presently claimed invention is manufactured by powder processing followed by hot pressing of discs. A ceramic slurry is manufactured by wet dispersion of suitable amounts of alumina, yttria-stabilized zirconia, titanium nitride and silicon carbide whiskers in water. A suitable, conventional dispersing agent is added. The slurry is dried and granulated, preferably freeze granulated according to U.S. Ser. No. 08/089,560 and 08/090,960. In this case, the slurry is sprayed into a vessel with temperature well below the freezing point of the water. The frozen granules are then transferred into a freeze drier where the frozen liquid is sublimated at suitable subpressure and temperature. The material is then hot pressed into discs. The hot press temperature should be 1500°–1750° C., preferably 1550°–1650° C., and the hot press pressure should be 5–40 MPa, preferably 20–40 MPa. If the heating up period of the hot pressing (the period before the hot pressing temperature is reached and the mechanical pressure is applied) is performed under subpressure (moderate vacuum) there will be a weight loss due to the formation of gaseous products (mainly SiO, CO and $N_2$). On the other hand, if the heating up period (the period before the hot pressing temperature is reached and the mechanical pressure is applied) is performed in nitrogen or carbon oxide at atmospheric pressure, the $ZrO_2$ will be thermodynamically stable and no diffusion of zirconium into the cubic phase will occur. In order to get an acceptable low weight loss in combination with zirconium diffusion, a moderately low subpressure, 50 to 800 mbar, preferably 100 to 500 mbar, is used. After the hot pressing pressure is applied, no vacuum pumping is needed. The hot pressed discs are cut into blanks and the blanks are ground into inserts.

In the description, titanium nitride is used as titanium-containing component. It is however, obvious that titanium zirconium carbonitrides of various compositions could be used as well.

The invention is additionally illustrated in connection with the following Examples which are to be considered as illustrative of the present invention. It should be understood, however, that the invention is not limited to the specific details of the Examples.

EXAMPLE 1

Ceramic slurries were made with four different compositions:

Composition A (according to the presently claimed invention): 10 volume % $ZrO_2$ (yttria-stabilized, 3 mole %)+5 volume % TiN+30 volume % SiC whiskers+balance alumina.

Composition B: 10 volume % $ZrO_2$ (yttria-stabilized, 3 mole %)+5 volume % TiN+balance alumina.

Composition C: 30 volume % SiC whiskers +5 volume % TiN+balance alumina.

Composition D: 30 volume % SiC whiskers+5 volume % TiC+10 volume % $ZrO_2$ (yttria-stabilized, 3 mole %)+balance alumina.

In each case, the SiC whiskers had a diameter of about 0.5 µm and an aspect ratio of about 20. The slurries were freeze granulated according to U.S. Ser. No. 08/089,560 and 08/090,960. The granulated powders were hot pressed into discs according to the following:

| Powder A | 1625° C. | 35 MPa | (heating up period at 400 mbar) |
| Powder B | 1625° C. | 35 MPa | (heating up period at 400 mbar) |
| Powder C | 1725° C. | 35 MPa | (heating up period at 400 mbar) |
| Powder D | 1625° C. | 35 MPa | (heating up period at 400 mbar) |

The materials were investigated XRD to evaluate the lattice spacing with the following results:

Material A 4.31 Å
Material B 4.245 Å
Material C 4.26 Å
Material D 4.31 Å

These results indicated that the lattice spacing of the cubic phase in Composition A is increased. An apparent increase in lattice spacing is only achieved when zirconia and silicon carbide whiskers are added to the alumina matrix in addition to titanium nitride. EPMA (electron probe microanalysis) has shown that the cubic phase of Composition A contains 18 weight % zirconium. For Composition D, the lattice spacing of the cubic phase is 4.31 Å, which is the same as for the original titanium carbide.

EXAMPLE 2

Ceramic slurries were made with three different compositions:

Composition A (according to the presently claimed invention): 10 volume % $ZrO_2$ (yttria-stabilized)+5 volume % TiN+30 volume % SiC whiskers+balance alumina.

Composition B: 10 volume % $ZrO_2$ (yttria-stabilized)+30 volume % SiC whiskers+balance alumina.

Composition C: 30 volume % SiC whiskers+balance alumina.

The SiC whiskers are the same as in Example 1. The slurries were freeze granulated according to U.S. Ser. No. 08/089,560 and 08/090,960. The granulated powders were hot pressed into discs according to the following:

| Powder A | 1625° C. | 35 MPa | (heating up period at 400 mbar) |
| Powder B | 1725° C. | 35 MPa | (heating up period at 400 mbar) |
| Powder C | 1825° C. | 35 MPa | (heating up period at 400 mbar) |

The cubic phase of sintered material of Composition A was investigated by XRD and showed a lattice spacing of 4.31 Å.

The discs were cut into blanks and ground to inserts with the style RNGN 120400 T01020. The inserts were tested in a specially designed turning operation according to the following:

Workpiece: Iconel 718A
Cutting Speed: 250 mm/min
Cutting Depth: 0–6 mm
Feed: 0.15 mm/rev
Result (appearance of the edge after eight cycles (about 4 minutes engagement)):
Variant A: best
Variant B: as reference
Variant C: reference These results indicate that the composition of Variant A gives inserts with the best edge strength.

EXAMPLE 3

Inserts with the same composition and style as Example 1 were tested in another turning operation in which operation notch wear resistance is tested.

Workpiece: Iconel 718A
Cutting Sped: 350 mm/min
Cutting Depth: 1.5 mm
Feed: 0.15 mm/rev
Result (average notch length relative to Variant C):
Variant A: 0.63
Variant B: 0.98
Variant C: reference (1.0)

This result indicates that the composition of Variant A gives the best notch wear resistance.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of manufacturing a ceramic material comprising alumina, 10–50% by volume of silicon carbide whiskers, 1–25% by volume of zirconia and 1–20% by volume of a titanium compound-containing cubic phase comprising mixing and granulating powders of silicon carbide whiskers, alumina and zirconia and a titanium compound capable of forming a cubic phase and hot pressing the mixture at a hot press temperature of 1500°–1750° C. a mechanical pressure of 5–40 MPa having a heating up period before the hot pressing temperature is reached and the mechanical pressure is applied, being performed under a subpressure of 50 to 800 mbar.

2. The method of claim 1 wherein the mixture is hot pressed at a temperature of 1550°–1650° C.

3. The method of claim 1 wherein the mixture is hot pressed at a pressure of 20 to 40 MPa.

4. The method of claim 1 wherein the titanium compound is titanium nitride.

5. The method of claim 1 wherein the titanium compound is titanium zirconium carbonitride.

6. The method of claim 1 wherein the heating up period is performed under a subpressure of 100 to 500 mbar.

7. The method of claim 1 wherein said granulating is performed by freeze granulation followed by freeze drying.

* * * * *